United States Patent
Daniau

(10) Patent No.: US 7,464,534 B2
(45) Date of Patent: Dec. 16, 2008

(54) PULSED DETONATION ENGINE

(75) Inventor: Emeric Daniau, La Chapelle Saint Ursin (FR)

(73) Assignee: MBDA France, Paris (FR)

( * ) Notice: Subject to any disclaimer, the term of this patent is extended or adjusted under 35 U.S.C. 154(b) by 686 days.

(21) Appl. No.: 10/529,556

(22) PCT Filed: May 27, 2004

(86) PCT No.: PCT/FR2004/001313

§ 371 (c)(1), (2), (4) Date: Mar. 29, 2005

(87) PCT Pub. No.: WO2004/109084

PCT Pub. Date: Dec. 16, 2004

(65) Prior Publication Data

US 2006/0048499 A1 Mar. 9, 2006

(30) Foreign Application Priority Data

May 28, 2003 (FR) .................................... 03 06489

(51) Int. Cl.
*F02C 5/00* (2006.01)
(52) U.S. Cl. .................. 60/39.76; 60/247; 123/294
(58) Field of Classification Search ............... 60/39.76, 60/39.78, 39.39, 247, 39.38; 123/294, 305
See application file for complete search history.

(56) References Cited

U.S. PATENT DOCUMENTS

| | | | | |
|---|---|---|---|---|
| 4,523,552 A | * | 6/1985 | Mukainakano et al. .. | 123/143 B |
| 4,790,270 A | * | 12/1988 | McKay et al. ............ | 123/73 C |
| 5,042,442 A | * | 8/1991 | Laskaris et al. ............ | 123/305 |
| 5,060,610 A | * | 10/1991 | Paro ........................... | 123/300 |
| 6,484,492 B2 | * | 11/2002 | Meholic et al. ............... | 60/247 |
| 6,505,462 B2 | * | 1/2003 | Meholic ..................... | 60/39.39 |
| 6,834,626 B1 | * | 12/2004 | Holmes ..................... | 123/52.5 |
| 7,100,360 B2 | * | 9/2006 | Sammann et al. .......... | 60/226.1 |
| 7,228,839 B2 | * | 6/2007 | Kuo et al. .................... | 123/294 |
| 2002/0139106 A1 | | 10/2002 | Meholic | |
| 2006/0219212 A1 | * | 10/2006 | Brachert et al. ............. | 123/295 |

FOREIGN PATENT DOCUMENTS

DE 947655 8/1956

OTHER PUBLICATIONS

PCT International Search Report dated Oct. 29, 2004.

* cited by examiner

*Primary Examiner*—William H Rodriguez
(74) *Attorney, Agent, or Firm*—Dickinson Wright, PLLC

(57) ABSTRACT

A pulsed detonation engine may include a flame tube with a lateral wall and a transverse base defining a combustion chamber and a supply device cyclically feeding said combustion chamber with a combustible charge. The transverse base of the flame tube may be movable for reciprocating in translation inside said flame tube in order to be able to occupy two boundary positions, a first position corresponding to the detonation phase of the combustible charge in the combustion chamber of said flame tube and a second position corresponding to the phase wherein the combustible charge is supplied to said combustion chamber.

12 Claims, 3 Drawing Sheets

PULSED DETONATION ENGINE

BACKGOUND OF THE INVENTION

1. Field of the Invention

The present invention relates to a pulsed detonation engine, that is to say a reciprocating internal combustion engine using a supersonic combustion mode (detonation) which makes it possible to deliver very high propagation speeds.

This type of engine is applicable especially, although not exclusively, in the aeronautical, space and military fields for equipping aircraft, rockets, missiles, etc.

2. Description of the Related Art

It is known that detonation is a particular method of propagating a flame which results from the coupling between a shock wave and a combustion front, with the result that the shock wave compresses the combustible charge (fuel/oxidizer mixture) situated in the combustion chamber of the engine, in order to bring it above its self-ignition temperature, and the energy released by the combustion in turn ensures the continuity of the shock wave. The operating cycle of such an engine can thus be reduced to three stages:

- a first stage relating to the supply phase wherein the combustible charge or mixture is supplied;
- a second stage relating to the detonation phase in which the chemical energy generated by the charge is compressed and released; and
- a third stage relating to the expansion phase of the detonation products.

Structurally, the combustion chamber of such an engine is defined by a flame tube closed at one end by a transverse base (termed thrust wall) against which the products from the detonation of the combustible charge press in order to generate the thrust, which charge is introduced into the chamber by a supply device.

It is quite obvious that the course of the various phases of the engine operating cycle is a potentially critical point, it being particularly important to have control over the supply phase, which can have a very great influence on the performance of such an engine.

Currently, two injection-supply control devices are mainly used: namely an aeroacoustic device which uses the overpressure in the chamber to block the admission of the combustible charge aerodynamically, and an electromechanical device using a controlled valve which is either of the conventional, translationally movable type or of the rotary type.

Although these supply devices are widely used, they nevertheless have disadvantages. Specifically, the aeroacoustic device depends on the injection conditions for the combustible mixture and, even though it is very simple to produce, it does not allow admission optimization for the whole range of operation of the engine, which leads to a reduction in the performance thereof. With regard to the electromechanical device, it requires conventional valves capable of passing through high instantaneous flow rates, therefore making these valves expensive, or rotary valves which, although well suited for rocket mode, are less efficient for aerobic operation. Furthermore, these two types of valves greatly complicate the design of the engine, the simplicity of whose construction remains one of the strong points.

SUMMARY OF THE INVENTION

The present invention has the aim of overcoming these disadvantages and relates to a pulsed detonation engine whose design is structurally simple and guarantees a high degree of operational safety.

To this end, the pulsed detonation engine supplied cyclically with a combustible charge fed into the combustion chamber of a flame tube with a transverse base by a supply device is noteworthy:

- in that said transverse base of the flame tube is mounted so that it can move with respect to the latter in order to be able to occupy two boundary positions, a first position corresponding to the detonation phase of the combustible charge in the combustion chamber of said tube and a second position corresponding to the phase wherein the combustible charge is supplied to said chamber;
- in that at least one supply opening for said combustible charge is provided in the lateral wall of said tube, this opening being closed off and separated from said combustion chamber by said movable base when the latter is occupying its first position and being in fluid communication with said chamber when said movable base is occupying its second position; and
- in that, in said first position, said transverse movable base is secured to said tube by releasable locking means.

Thus, by virtue of the invention, the engine dispenses with complex supply devices having valves or the like, since it is the transverse base itself, forming the thrust wall, which, by being able to move and thereby open and close the supply opening, dictates the operation of both the supply and detonation phases of the engine. Consequently, by controlling and ensuring correct operation of both these phases and their transitions, the movable base may be considered as forming an integral part of the supply device.

It will also be noted that the use of the transverse movable base for the autonomous control of the fuel/oxidizer admission into the combustion chamber is mechanically very simple, guaranteeing high levels of operational safety and reliability without, moreover, external energy having to be supplied.

For example, said transverse movable base may slide with respect to said tube between said two positions and/or it may rotate with respect to said tube between the two positions.

Said transverse base may advantageously take the form of a piston with a transverse wall facing said chamber and with a lateral skirt cooperating with the wall of said tube in order to close off said supply opening in the first position of said base, and said releasable locking means then comprise an internal block housed in said piston in a sliding manner and passing through its transverse wall so as to emerge in said combustion chamber, and also at least one locking roller subjected to the movement of said block and being able to pass radially through the lateral skirt of said piston in order to engage in a reception housing of said tube and to immobilize said base.

As a variant, said transverse movable base may be mounted rotationally on a piston arranged in said flame tube and be provided with peripheral locking tenons which are able to cooperate, in said first position, with locking housings which are made in said flame tube and are in communication with said combustion chamber, and, through the effect of a detonation, said transverse movable base can rotate with respect to said piston, inhibiting the cooperation of the locking tenons and the locking housings and enabling said piston to assume said second position.

Moreover, an internal stop is provided in said tube in order to mark the first position of said movable base. Preferably, said internal stop takes the form of an internal annular shoulder emanating from the lateral wall of said tube and against which the piston of said movable base is applied in its first position.

According to another characteristic, elastic return means are provided in said tube in order to return said movable base from its second position toward its first position. These elastic return means comprise, for example, at least one spring acting on the internal block of said movable base.

Moreover, said lateral supply opening is preferably disposed adjacently to said internal stop.

Moreover, the engine may comprise an ignition device which, advantageously, uses the reciprocating movement of said transverse movable base for cyclically igniting the combustible charge.

In a preferred, although not exclusive, embodiment, said ignition device is of the piezoelectric type and comprises, for example, a movable weight connected to said transverse movable base, a retaining device which is able to maintain said weight in the primed position, an elastic element for returning said weight to the percussion position subsequent to the release of said retaining device, and a piezoelectric member generating an electrical current in order to ignite said combustible charge when said weight comes into the percussion position.

BRIEF DESCRIPTION OF THE DRAWINGS

The figures of the attached drawing will make it clear to understand how the invention can be implemented. In these figures, identical references denote similar elements.

DETAILED DESCRIPTION OF THE INVENTION

Figure 1:
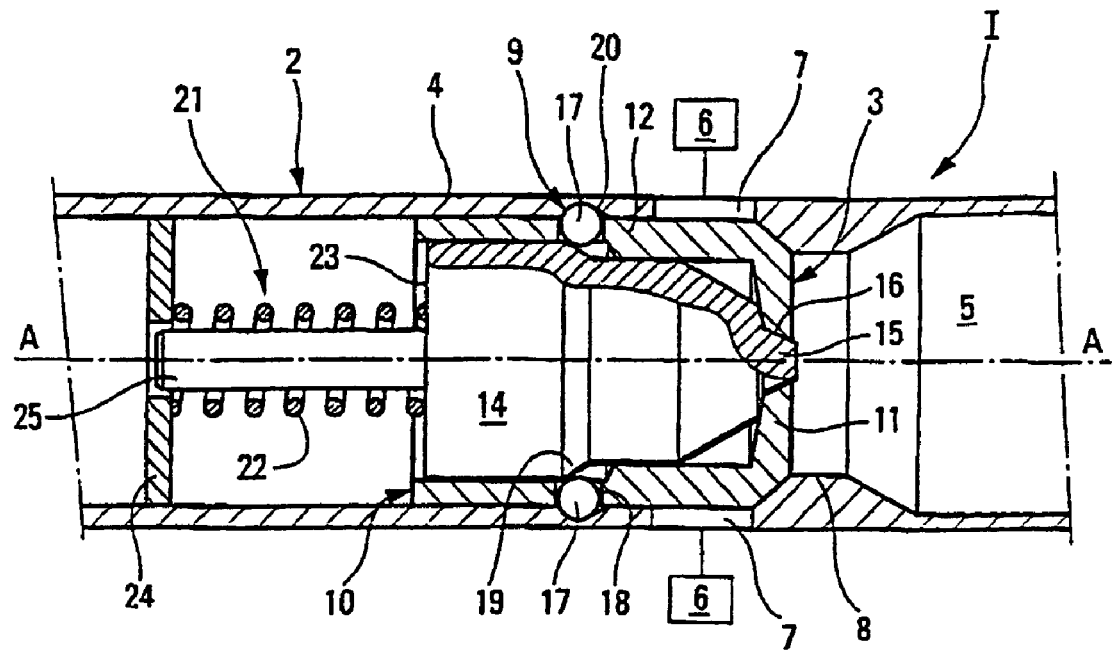
FIG. 1 is a schematic view in longitudinal section of a first exemplary embodiment of the pulsed detonation engine according to the invention, showing the movable base in the first position.
Figure 2:
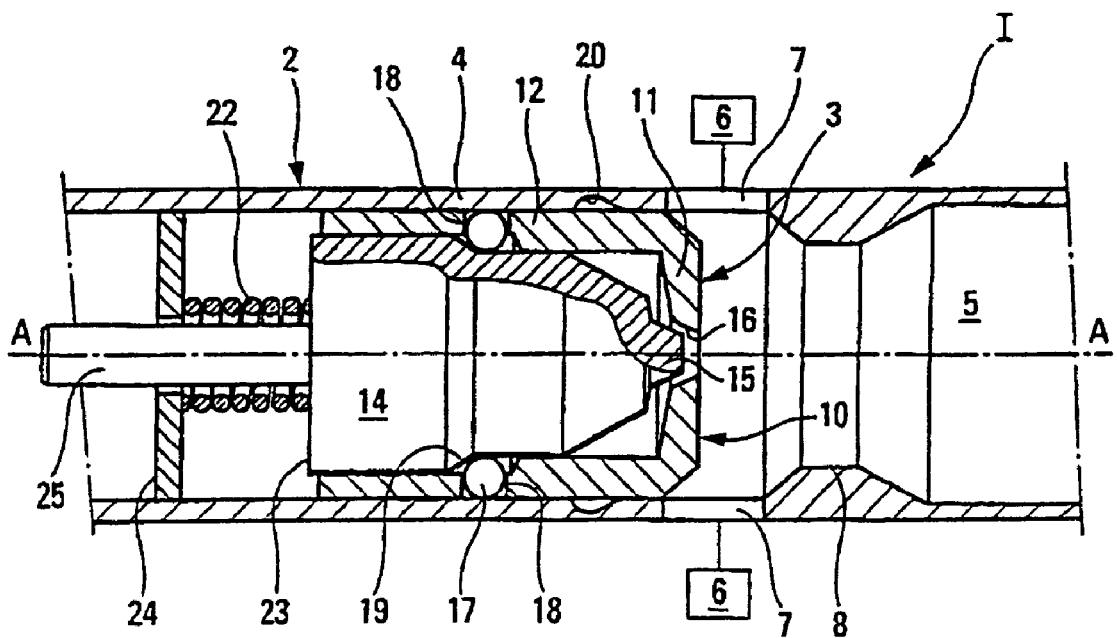
FIG. 2 is a similar view to the previous one, showing the movable base of said engine in its second position.

The pulsed detonation engine I, represented schematically and partially in FIGS. 1 and 2, comprises a cylindrical flame tube 2 with a longitudinal axis A, and a transverse base 3 housed, with a close fit, inside the flame tube 2. This transverse base 3 delimits, together with the lateral wall 4 of the tube 2, a combustion chamber 5 (illustrated in part) which is able to cyclically receive a combustible charge obtained from a supply device (denoted by a rectangle and referenced 6) which supplies the fuel/oxidizer mixture. The transverse base 3 defines the thrust wall against which the detonation products of the combustible charge are applied in order to generate the thrust.

According to the invention, the transverse base 3 is mounted so that it can move with respect to the flame tube 2 of the engine I and is able to move between two distinct boundary positions, a first position (FIG. 1) isolating the combustion chamber 5 from the supply device 6, corresponding to the detonation phase of the combustible charge, and a second position (FIG. 2) placing the supply device and the combustion chamber in fluid communication, corresponding to the supply phase wherein the chamber is supplied with the combustible charge.

To make this possible, openings 7 for admitting the combustible charge from the supply device 6 into the chamber 5 are made in the lateral wall 4 of the flame tube, which openings 7 are closed off when the transverse movable base 3 is in its first position and freed when it is occupying its second position. Thus, the movable base 3 makes it possible for the combustion chamber 5 to be separated from and placed in communication with the incoming mixture in the manner of the prior art valves, controlling the supply device.

As the two figures show, the movement of the transverse base 3 between its two positions is, in this preferred embodiment, of the sliding type along the longitudinal axis A, but it could be of the rotary, or even helical, type. Thus, to mark the first position of the sliding base 3, an internal annular shoulder 8 is provided in the lateral wall 4 of the tube, with the result that the base is applied against this shoulder 8 by the chamfered edges thereof during each operating cycle of the engine, thereby defining its "top dead center". Moreover, to maintain the sliding base 3 in this first position during the detonation phase of the engine, releasable locking means 9 are provided in order to temporarily couple the sliding transverse base 3 with the tube 4.

In the embodiment illustrated, the transverse base 3 takes the structural form of a piston 10 composed, as is usual, of a transverse wall 11 facing the combustion chamber and of a lateral skirt 12 which cooperates, with a close fit, with the lateral wall 4 of the tube 2. In this way, as shown in FIG. 1, the lateral skirt 12 of the piston closes off the admission or supply openings 7 for the combustible mixture, which openings are made in the tube 2 adjacently to the internal annular shoulder 8.

Situated inside the piston 10 is a cylindrical internal block or body 14 which cooperates with the lateral skirt 12 of the piston and has one end 15 which is conical so that it can engage in a corresponding axial hole 16 made in the center of the transverse wall 11 of the piston and thus emerge in the combustion chamber 5. It will therefore be understood that this block is axially movable with respect to the piston under the action of the detonation gases. Moreover, as shown in FIG. 1, locking rollers or balls 17 are accommodated in radial passages 18 of the lateral skirt of the piston and partly engage, under the action of a conical shoulder 19 forming a ramp and provided at the periphery of the block 14, in reception housings 20 made correspondingly in the lateral wall 4 of the tube 2. Two rollers 17 are represented in FIG. 1 but the number thereof could be different. The assembly formed by the internal block 14 and the rollers 17 defines the locking means 9 for immobilizing the piston 10, that is to say the transverse base 3, in its first position.

In addition, elastic return means 21 are provided between the transverse movable base 3 and the tube 2, on the opposite side from the chamber 5 in order to spontaneously return said base from its second position (FIG. 2) toward its first, locked position (FIG. 1). For example, these means are simply defined by a compression spring 22 arranged between the end 23 of the block, this end being opposed to the conical end 15, and a transverse support 24 provided in the tube 2. In the conventional manner, a guide rod 25 for the spring, emanating from the end 23 of said block, may be associated with said spring.

The operating cycle of such a pulsed detonation engine described above is as follows.

First of all, it is assumed that the engine I is in the configuration illustrated in FIG. 1 in which the transverse movable base 3 is in its first position, that is to say:

is bearing against the internal annular shoulder 8 of the tube 2, under the action of the spring 22, and provides the combustion chamber 5 with sealing through the cooperation of the chamfered edges of the piston 10 and of the shoulder 8;

closes off the admission openings 7 of the tube by way of the lateral skirt 12 of the piston 10, with the result that the combustion chamber 5 is separated from the incoming mixture obtained from the supply device 6; and is locked in this position by the locking rollers 17 passing partially through its lateral skirt 12 and engaged in the reception housings 20 of the tube, through the action of the conical ramp 19 of the block 14, this block being pushed by the spring 22 and having its end 15 close off the hole 16.

When the detonation of the compressed combustible mixture in the chamber 5 takes place, via an ignition device which will be described in relation to FIG. 3, the pressure increases greatly in the chamber, but the piston 10 of the base 3, forming the thrust wall, is locked in position by the locking rollers 17 and is therefore unable to retreat. By contrast, the detonation gases are in contact with the conical end 15 of the internal block 14, which end emerges in the chamber 5 through the central hole 16 of the transverse wall 11 of the piston, and these gases act on the block which, as a result of the pressure generated, retreats and starts to compress the spring 22. During its axial retreating movement, the locking rollers 17 follow the conical ramp 19 of the block 14 and thus leave the housings 20 of the flame tube 2 so as to be accommodated in the radial passages 18 of the piston.

The pressure in the combustion chamber 5 is provisionally dropped through the effect of the rear expansion of the detonation products and, since the movable base 3 is no longer locked, this space can therefore retreat freely, together with the internal block 14, to the left in FIG. 1 against the action of the spring through the effect of the residual overpressure prevailing in the chamber. Simultaneously, the lateral skirt 12 of the piston 10 uncovers the admission openings 7 of the tube 2 and the movable base 3 then reaches its second position illustrated in FIG. 2, compressing the spring 22 arranged between the support 24 for the tube and the end 23 of the block.

The admission openings 7 of the flame tube 2 are entirely freed during the depression phase caused by the overexpansion of the detonation products. Moreover, an auto-suction phenomenon consequently makes it possible for the combustion chamber 5 of the engine to be autonomously filled with fuel/oxidizer mixture from the supply device.

Then, under the action of the compression spring 22, the internal block 14 and the movable piston 10 are returned toward the chamber, the piston closing off the admission openings 7 and butting axially against the shoulder 8 of the tube, while the locking rollers 17, under the action of the conical ramp 19, re-engage in the housings 20 of the tube, thereby immobilizing the base 3 in its first position.

A new operating cycle for the engine I can begin.

Figure 3:
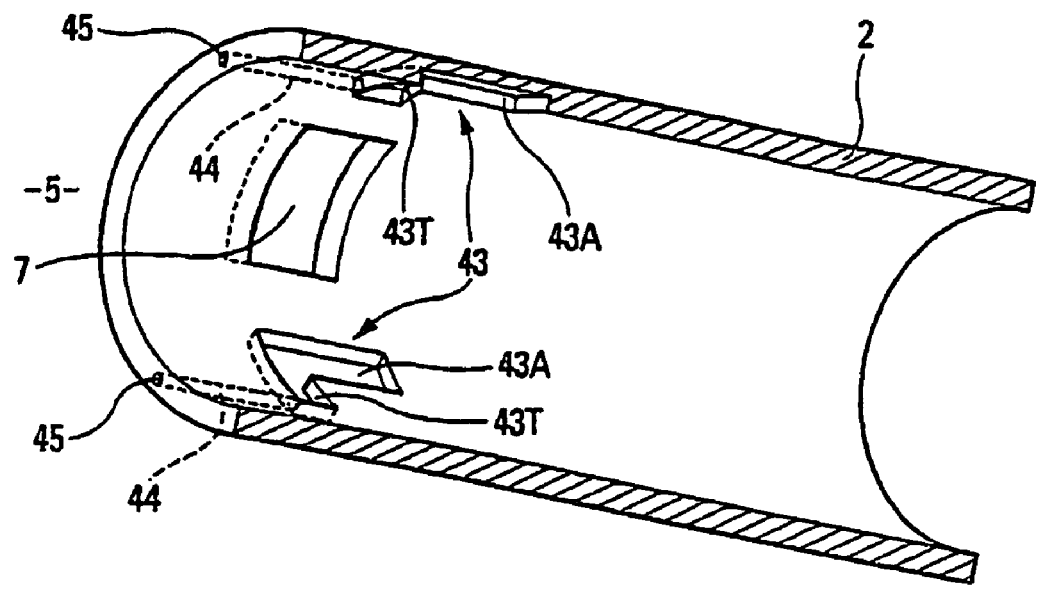
FIG. 3 shows schematically, in section and perspective, the inside of the flame tube of a second exemplary embodiment of the present invention.
Figure 6:
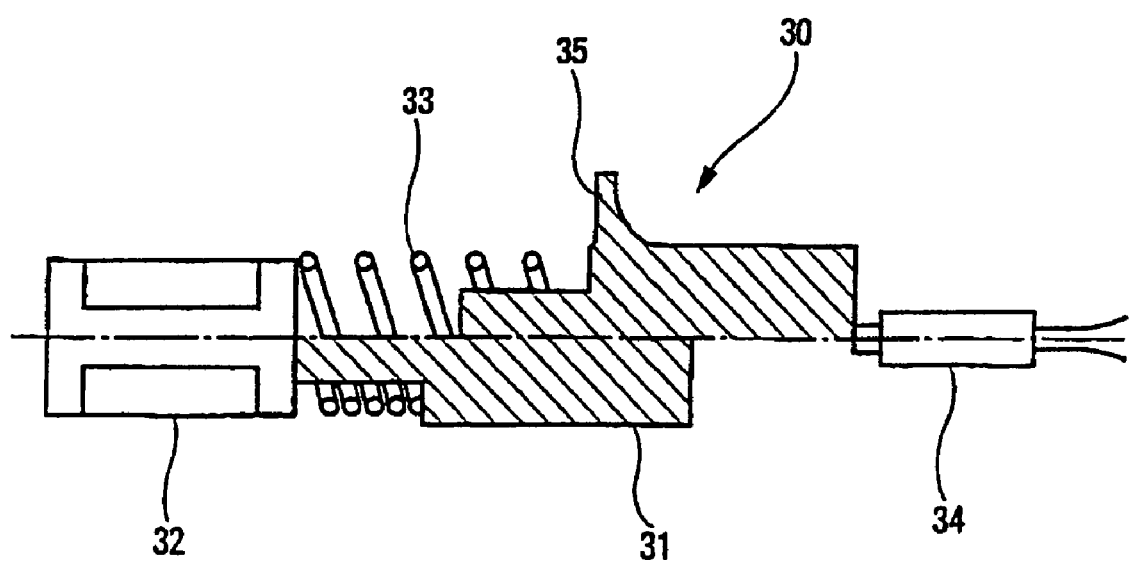
FIG. 6 is a schematic view of an ignition device of said engine, in which two half-sections, one lower and one upper, are used to represent its two end operating positions.
Figure 4:
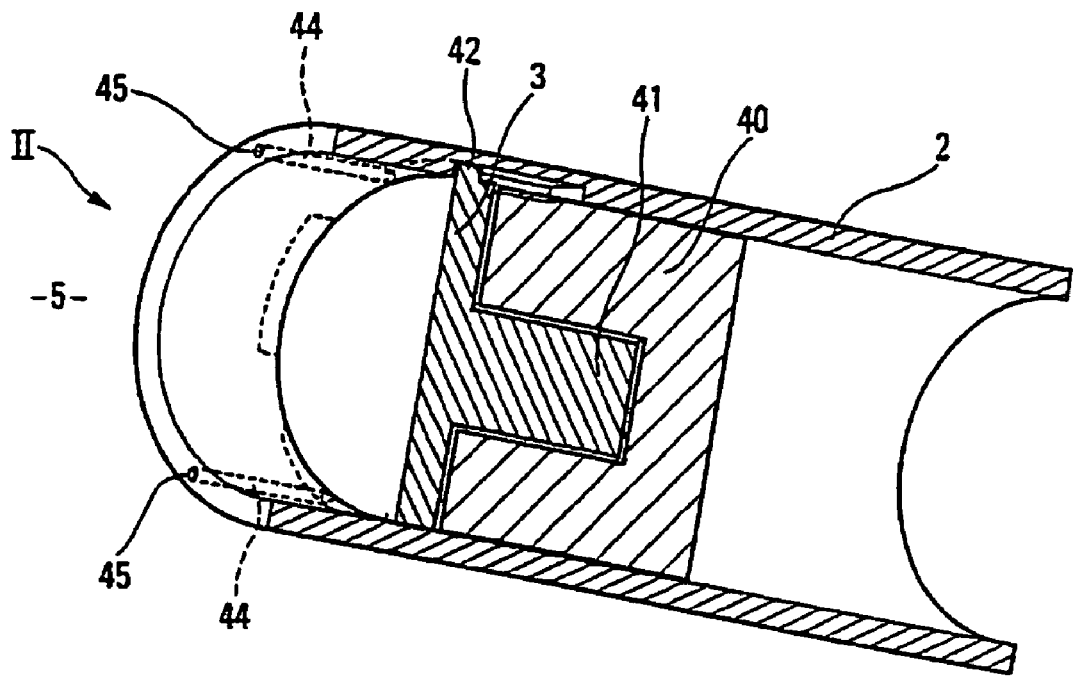
FIGS. 4 and 5 show, schematically and respectively, the first and second positions of the transverse movable base of the flame tube of FIG. 3.
Figure 5:
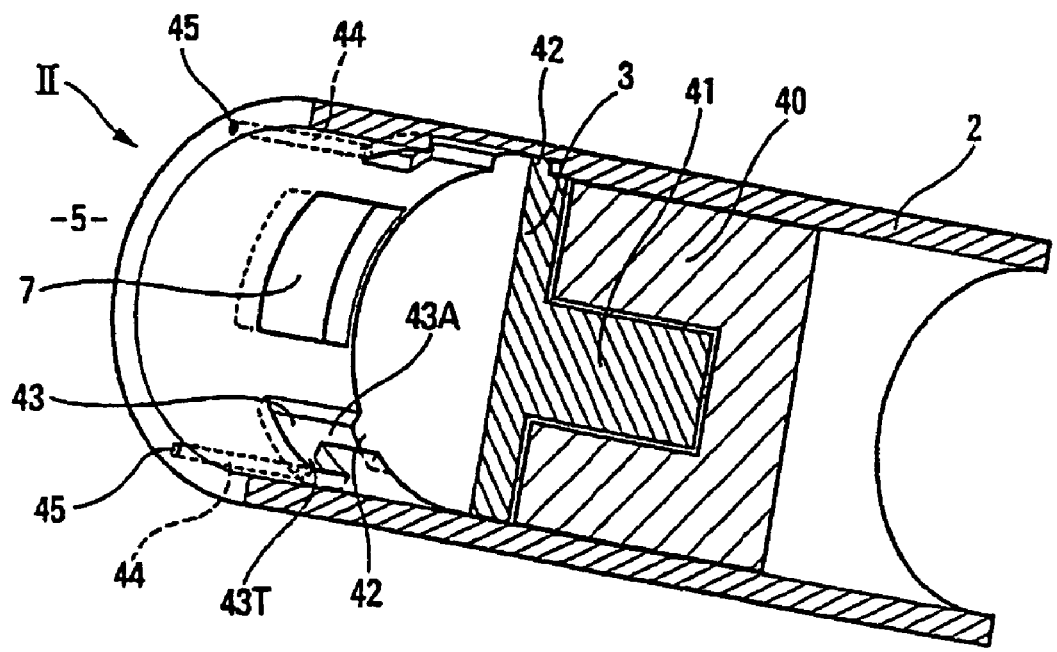

In the embodiment II of FIGS. 3, 4 and 5, the transverse immovable base 3 of the flame tube 2 is mounted rotationally on a piston 40 arranged in this tube, for example by means of an elastically loaded axial shaft 41 (in a manner which is known but has not been represented). At its periphery, the transverse movable base 3 is provided with locking tenons 42 which are able to cooperate, in said first position (FIG. 4), with locking housings 43 made in the thickness of said flame tube 2. Each locking housing 43 is in the shape of a L with an axial branch 43A and a transverse branch 43T. Each transverse branch 43T is in communication with the combustion chamber 5 through a duct 44, which emerges at 45 on the combustion chamber side.

The operating sequence for the engine II of FIGS. 3 to 5 is as follows:

since the assembly of the transverse movable base 3 and the piston 40 are in the first position (FIG. 4), and the locking tenons 42 bear in the transverse branches 43T of the locking housings 43 under the action of the elastic load on said axial shaft 41 and the supply openings 7 are closed off;

when the detonation of the combustible charge present in the combustion chamber 5 is initiated, the pressure increases greatly in said chamber, but the transverse movable base 3 and the piston 40 are immobilized by the locking tenons 42 and are unable to retreat;

however, when the detonation sweeping over the combustion chamber 5 reaches the height of the orifices 45 of the ducts 44, a portion of the pressurized gases is captured and directed toward the locking housings 43;

under the action of the overpressure in said locking housings 43, the tenons 42 are driven laterally out of the transverse branches 43T against the action of the elastic load on the axial shaft 41, with the result that the transverse movable base 3 rotates with respect to the piston 40 and unlocks the latter;

the assembly of the transverse movable base 3 and the piston 40 is therefore able to retreat freely through the effect of the residual overpressure so as to assume said second position and expose the supply openings 7, said tenons 42 following the axial branches 43A of the housings 43;

said supply openings 7 are completely open during the depression phase caused by the overexpansion of the detonation products, the self-suction phenomenon making it possible for the combustion chamber 5 to be filled autonomously with fuel/oxidizer mixture;

under the action of the return spring 21 (not shown in FIGS. 3 to 5), the assembly of the movable base 3 and the piston 40 is returned toward the front, the locking tenons 42 follow the axial branches 43A of the housings 43 and, once they have come up against the front stop, penetrate the transverse branches 43 under the action of the elastic load on the axial shaft 41, causing the base 3 to rotate in a limited manner.

The engine II is therefore once more in its first position, ready for a new cycle.

In addition to the aforementioned advantages provided by the movable base (combustion chamber/incoming air supply and uncoupling), the reciprocating movement of the thrust wall may also be exploited to produce the energy which can be used to ignite the combustible load or to partly cover the electrical requirements of the motorized appliance.

Such is particularly the case with the ignition device 30 represented in FIG. 3, which, via means 31, 32, 33, 34 uses the reciprocating movement of the transverse movable base 3 to cyclically ignite the combustible charge.

In the embodiment illustrated, this device 30 is of the piezoelectric type but it could be in the form of an induction coil or the like. Structurally, the means of the device comprise a movable weight 31, a retaining device 32 such as, in this example, an electromagnet, an elastic element 33 and a piezoelectric member 34.

The weight 31 is provided with a lug 35 so that it can be connected to the movable base 3 (not shown), and it is arranged between the electromagnet 32 and the piezoelectric member 34 to allow it to move in a reciprocating manner parallel to the axis A between two respective positions.

The first position of the weight 31 corresponds to the lower half-view of FIG. 3 in which the weight 31, fed in by the retreating movement of the movable base via the lug 35, is primed and connected to the electromagnet 32 by virtue of the supply current circulating in the latter. In this primed position in which the movable base is in its second position (FIG. 2), the elastic element 33, such as a compression spring, situated between the electromagnet and the weight, is compressed and the weight is moved away from the piezoelectric member. In this example, the retaining device 32 for the weight is of the electrical type but it could be of the mechanical type.

The second position of the weight 31 corresponds to the upper half-view of FIG. 3 in which the weight is released from the retaining device and strikes against the crystal of the piezoelectric member 34 as a result of the supply current of the electromagnet 32 being cut off and of the action of the elastic element 33. Its contact with the piezoelectric device 34 generates a high-voltage current used for igniting the engine, that is to say for igniting the combustible charge, when the movable base 3 is in its first position (FIG. 1).

Furthermore, the Applicant has found that the movable thrust wall also makes it possible to have better control over the thrust by smoothing the pulse-like character of the detonation and by attenuating the vibratory environment likely to be generated by such an engine, which can only facilitate the integration of this type of engine in aeronautical airframes.

The invention claimed is:

1. A pulsed detonation engine having a flame tube with a lateral wall and a transverse base defining a combustion chamber and a supply device cyclically feeding said combustion chamber with a combustible charge, wherein:
    said transverse base of the flame tube is movable for reciprocating in translation inside said flame tube in order to be able to occupy two boundary positions, a first position corresponding to the detonation phase of the combustible charge in the combustion chamber of said flame tube and a second position corresponding to the phase wherein the combustible charge is supplied to said combustion chamber;
    at least one supply opening for said combustible charge is provided in a lateral wall of said flame tube, said supply opening being closed off and separated from said combustion chamber by said movable transverse base when said movable transverse base is occupying the first position and being in fluid communication with said combustion chamber when said movable transverse base is occupying the second position; and
    in said first position, said transverse movable base is secured to said flame tube by a releasable locking unit.

2. The engine as claimed in claim 1, wherein said transverse movable base slides with respect to said flame tube between the first and second positions.

3. The engine as claimed in claim 1, wherein said transverse movable base rotates with respect to said flame tube between the first and second positions.

4. The engine as claimed in claim 1, wherein an internal stop is provided in said flame tube in order to mark the first position of said movable transverse base.

5. The engine as claimed in claim 4, wherein said internal stop comprises an internal annular shoulder emanating from the lateral wall of said flame tube and against which a piston of said movable base is applied in the first position.

6. The engine as claimed in claim 4, wherein said lateral supply opening is disposed adjacently to said internal stop.

7. The engine as claimed in claim 1, wherein an elastic return unit is provided in said flame tube in order to return said movable transverse base-from the second position toward the first position.

8. The engine as claimed in claim 7, wherein said elastic return unit comprises at least one spring acting on a block of said movable transverse body.

9. The engine as claimed in claim 1, of the type comprising an ignition device, wherein said ignition device comprises a unit that uses the reciprocating movement of said transverse movable base and cyclically ignites the combustible charge.

10. The engine as claimed in claim 9, wherein said ignition device is of the piezoelectric type and the unit comprises a movable weight connected to said transverse movable base, a retaining device (which is able to maintain said weight in a primed position, an elastic element for returning said weight to a percussion position subsequent to the release of said retaining device, and a piezoelectric member generating an electrical current in order to ignite said combustible charge when said plate comes into the percussion position.

11. A pulsed detonation engine having a flame tube with a lateral wall and a transverse base defining a combustion chamber and a supply device cyclically feeding said combustion chamber with a combustible charge, wherein:
    said transverse base comprises a piston with a transverse wall facing said combustion chamber and with a lateral skirt cooperating with the wall of said flame tube, said piston configured to reciprocate inside said flame tube and to occupy two boundary positions, a first position corresponding to a detonation phase of the combustible charge in the combustion chamber of said flame tube and a second position corresponding to a phase wherein the combustible charge is supplied to said chamber;
    at least one supply opening for said combustible charge is provided in the lateral wall of said flame tube, said supply opening being closed off and separated from said combustion chamber by said lateral skirt when said piston is occupying said first position and being in fluid communication with said chamber when said piston is occupying said second position; and
    in said first position, said piston is secured to said tube by a releasable locking unit comprising an internal block housed in said piston in a sliding manner and passing through said transverse wall of said piston so as to emerge in said combustion chamber, and also at least one locking roller subjected to a movement of said block and configured to pass radially through the lateral skirt of said piston in order to engage in a reception housing of said tube and to immobilize said transverse movable base.

12. A pulsed detonation engine having a flame tube with a lateral wall and a transverse base defining a combustion chamber and a supply device cyclically feeding said combustion chamber with a combustible charge, wherein:
    said transverse movable base is mounted rotationally on a reciprocating piston arranged in said flame tube and configured to occupy two boundary positions, a first position corresponding to a detonation phase of the combustible charge in the combustion chamber of said flame tube and a second position corresponding to a phase wherein the combustible charge is supplied to said chamber;
    at least one supply opening for said combustible charge is provided in the lateral wall of said flame tube, the at least one supply opening being closed off and separate from said combustion chamber by said piston occupying said first position and being in fluid communication with said combustion chamber when said piston is occupying said second position; and
    said piston is provided with peripheral locking tenons which are able to cooperate, in said first position, with locking housings which are disposed in said flame tube and are in communication with said combustible chamber and, through the effect of a detonation, said transverse movable base rotates with respect to said piston, inhibiting the cooperation of the locking tenons and the locking housing and enabling said piston to assume said second position.

* * * * *